Figure 1:
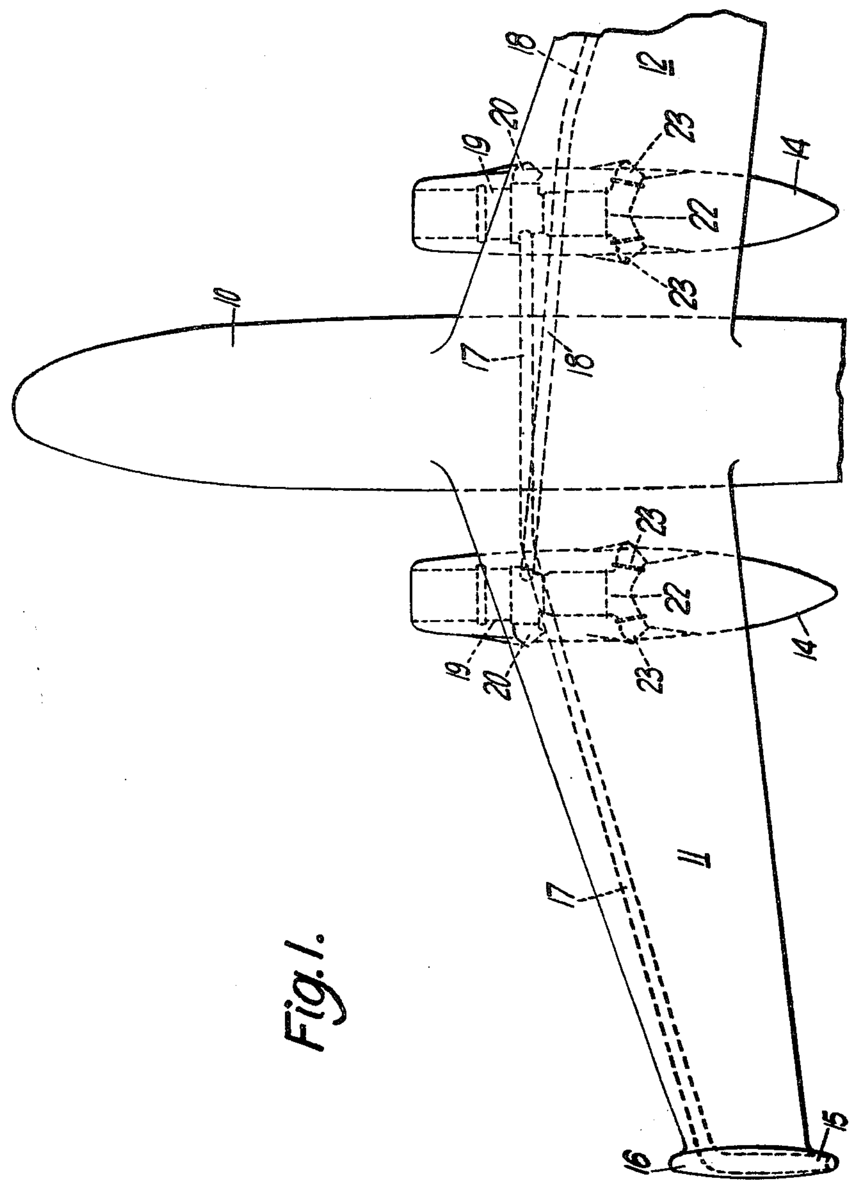

AIRCRAFT HAVING GAS-TURBINE JET PROPULSION AND SUSTENTATION ENGINES

Original Filed Dec. 19, 1961

15
25
26
27
33
31
16
32
30
17

16
11
17
13
20
14
23
21
10
21
23
14
20
13
18
12

United States Patent Office 3,173,628 Patented Mar. 16, 1965

3,173,628

AIRCRAFT HAVING GAS-TURBINE JET PROPULSION AND SUSTENTATION ENGINES

Francis Charles Ivor Marchant and Samuel Robinson, Bristol, England, and Alessandro Brena and Antonio Pizzarello, Milan, Italy, assignors to Bristol Siddeley Engines Limited, Bristol, England, a British company, and S.I.A.I. Marchetti Spa., Sesto Calende, Varese, Italy, an Italian company Continuation of application Ser. No. 160,597, Dec. 19, 1961. This application Aug. 5, 1963, Ser. No. 300,958
13 Claims. (Cl. 244—12)

This invention relates to aircraft having gas turbine jet propulsion and sustentation engines and is a continuation application of Serial No. 160,597, filed by us on December 19, 1961, now forfeited.

According to this invention in one aspect there is provided an aircraft with a propulsion system comprising port and starboard gas turbine jet propulsion engines which include propulsion nozzles arranged to be supplied with air from the compressor systems of the engines and propulsion nozzles arranged to be supplied with exhaust gas from the turbine systems of the engines, additional propulsion nozzles located outboard of the engines and their aforesaid propulsion nozzles, ducting for conveying air compressed by a port engine to one of the additional propulsion nozzles which is located outboard of a starboard engine, ducting for conveying air compressed by a starboard engine to one of the additional propulsion nozzles which is located outboard of a port engine, said propulsion nozzles and additional propulsion nozzles being adjustable and located to vary their direction of discharge between a rearward direction and a downward direction in which their resultant upthrust passes substantially through the centre of gravity of the aircraft to provide vertical or short take-off and landing capability, and means for interrupting the supply of compressed air to a starboard additional propulsion nozzle should a port engine fail and for interrupting the supply of compresssed air to a port additional propulsion nozzle should a starboard engine fail.

According to the invention in another aspect there is provided an aircraft having propulsion means comprising a pair of gas-turbine jet propulsion units each of which units includes turbine means and compressor means driven by the turbine means, two propulsion nozzles at one side of the pair of units one of which nozzles is supplied, under normal operating conditions of the aircraft, with compressed air from the compressor means of one of the units for providing a propulsive thrust, and the other of which nozzles is supplied, under normal operating conditions of the aircraft, with effluent gas from the turbine means of the other unit for providing a propulsive thrust, and two propulsion nozzles at the other side of the pair of units one of which nozzles is supplied, under normal operating conditions of the aircraft, with compressed air from the compressor means of said other unit for providing a propulsive thrust, and the other of which nozzles is supplied, under normal operating conditions of the aircraft, with effluent gas from the turbine means of said one unit for providing a propulsive thrust, all of said nozzles being adjustable to vary their direction of discharge for obtaining a resultant thrust on the aircraft the direction of which thrust can be varied between a forward direction and an upward direction.

Figures 2, 4:
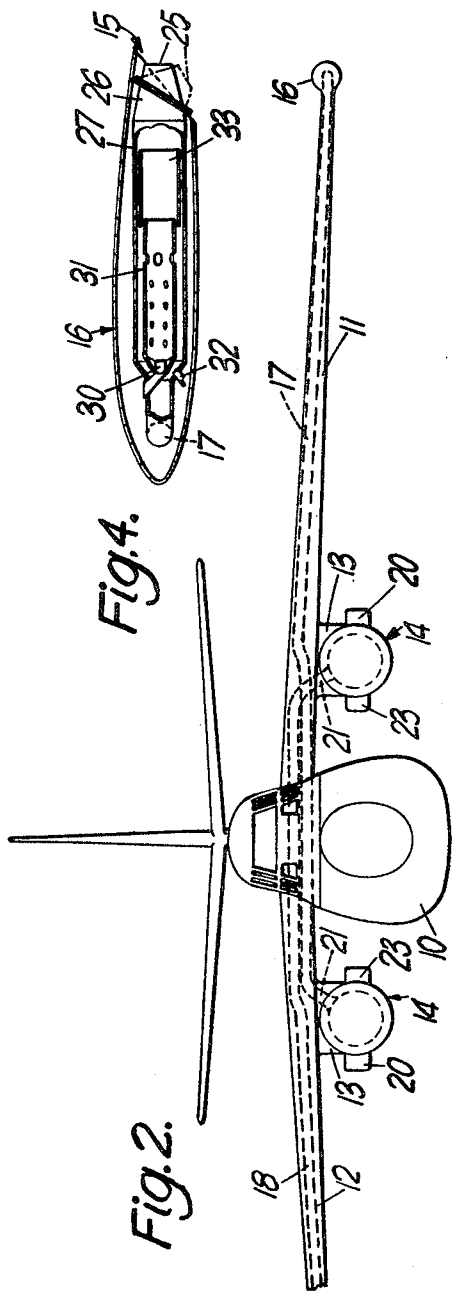
Figures 3, 5:
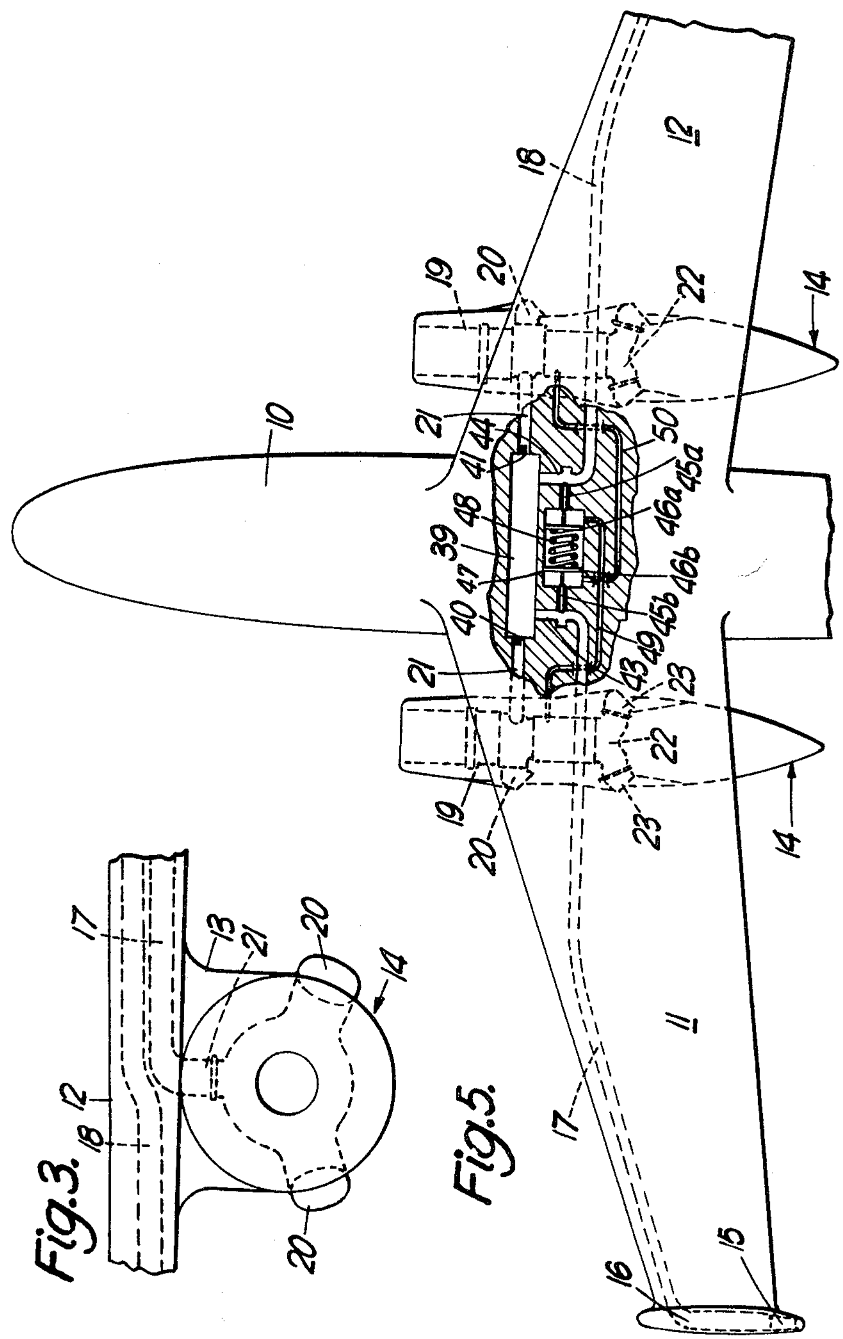

One embodiment of the invention and a modification of this embodiment will now be described by way of example with reference to the accompanying diagrammatic drawings in which:

FIGURE 1 is a plan of part of a twin-engined aircraft showing air ducting which leads from the main engines to additional propulsion nozzles at the wing tips, FIGURE 2 is a front view corresponding to FIGURE 1, FIGURE 3 is a detail view on a larger scale of a slightly modified engine, FIGURE 4 is a detailed section on a larger scale of one of the additional nozzles provided with a combustor, and FIGURE 5 is a plan corresponding to FIGURE 1, which shows one form of valve system in the air ducting.

FIGURES 1, 2 and 5 illustrate part of a moderately high wing air craft of conventional general form having a fuselage 10 and port and starboard wings 11, 12. The wings support, through pylons 13, two main jet propulsion units 14 disposed adjacent the fuselage 10. The wings also carry at their tips (only one of which is shown) two combustors 16 which are supplied with compressed air, the air being heated, if desired, by burning fuel in it in the combustors, and the hot products of combustion, or compressed air as the case may be, being passed to atmosphere through additional propulsion nozzles 15 secured to the combustors 16. The compressed air is derived from the main units 14 and is conveyed by crossover ducting 17, 18 to the combustors 16 whence it is delivered to the additional nozzles 15 for discharge to atmosphere.

Each main unit 14 may be substantially similar to any of the constructions described in our patent application Serial No. 711,350, now forfeited. In our present arrangement each unit comprises a gas turbine jet propulsion engine 19 (shown in dotted outline) including axial-flow low pressure and high pressure compressors, the delivery from the low pressure compressor being divided into two air streams, one of which is conveyed to a single rotatable air nozzle 20 of pipe bend form mounted on or adjacent the outboard side of the engine, and the other of which is conveyed upwards by an inclined pipe 21 (FIGURE 2) within the pylon 13 to the inboard end of the ducting 17 or 18 as the case may be. The compressed air stream from the starboard unit 14 which enters the ducting 17 is conveyed to the combustor 16 and nozzle 15 at the tip of the port wing whilst the compressed air stream from the port unit 14 which enters the ducting 18 is conveyed in a corresponding manner to the combustor and nozzle at the tip of the starboard wing. The engine jet pipe 22 for the turbine exhaust gas is forked the branches thereof terminating in rotatable gas nozzles 23 of pipe bend form mounted on opposite sides of the engine.

Each of the pipe bend nozzles 20, 23 is arranged to be capable of swivelling about an axis normal to the plane of its joint with the main casing of the engine in order to vary its direction of discharge between the rearward sense and forward of the vertically downward sense and the rotational movements of nozzles 20, 23 are synchronised so that they discharge substantially parallel jets in the same general direction. For forward propulsion the nozzles 20, 23 are rotated to discharge rearwards, for lifting thrust e.g. for use in take-off, they are rotated discharge downwards, and for braking they are rotated to discharge both downwards and forwards.

The additional nozzles 15 are also rotatable to vary their direction of discharge but as illustrated their construction, operation and range of movement differs from those of the nozzles 20 and 23. Referring to FIGURE 4, each nozzle 15 comprises a straight downstream section 25 which includes the nozzle outlet and a straight upstream section 26 which is secured at its inlet end to the downstream end of the casing 27 of the adjacent combustor 16 and is joined at its outlet end to the downstream section 25 through a joint the plane of which is oblique to the lengthwise axis of the upstream section.

The two sections are in alignment as shown in full lines when a rearward discharge is required. To vary the direction of discharge the downstream section 25 is rotated about an axis normal to the oblique plane of the joint. The joint face of the section 25 and the section 26, viewed at right angles thereto is of course circular. The range of directional control of the downstream sections 25 is less than that of the pipe bend nozzles and depends on the degree of obliquity of the joint, but it may be of the order of 90°. Within the limits of their rotational range the directional adjustment of the nozzles 15 may be synchronised with those of the nozzles 20, 23. The downstream sections 25 of the nozzles 15 may be provided with guide vanes as described in our co-pending application Serial No. 85,880, now abandoned.

The rotation of all eight nozzlse may be carried out by means of one or more air servo motors operated by compressed air tapped from one or both propulsion units and mechanically connected to a number of sprocket wheels each of which is arranged to drive a chain surrounding one of the nozzles and attached at its ends to the nozzle. The nozzles are so constructed and arranged that when they are all directed downwards as far as they can go the resultant thrust due to the discharge from the nozzles passes through or near the centre of gravity of the aircraft.

Each combustor 16 (FIGURE 4) comprises a casing 27 which extends fore and aft in alignment with the fixed section of the adjacent nozzle 15, a fuel injector 30 mounted in a flame tube 31, an igniter 32, and a protective lining 33 which extends downstream of the flame tube outlet. The compressed air from the ducting 17 or 18 enters the combustor casing at its forward end and is delivered to the nozzle 15 either as air unheated by the combustor or as combustion gas depending on whether combustion is selected.

Each unit 14 therefore feeds three adjacent nozzles and one remote nozzle 15 which is located on the opposite side of the plane of symmetry of the aircraft and at the outermost part of the opposite wing.

FIGURE 3 shows a front view of a slightly modified main unit 14 in which the low pressure compressor of the unit is arranged to feed two adjacent rotatable nozzles 20 of pipe bend form mounted on opposite sides of the engine as well as an upright pipe 21 which leads the third stream of compressed air to the inboard end of the ducting 17. The advantages of this arrangement are that the units are interchangeable and that the use of two adjacent air nozzles permits smaller air nozzles to be employed thus reducing the frontal area of the unit.

The jet propulsion system may be operated in the following manner. The main units 14 are started and run-up for testing with all the nozzles 15, 20 and 23 pointing rearwards so that the ground is undamaged by the nozzle jets. All the nozzles are then rotated to provide a substantial downward component of thrust for a short take-off run or as far downwards as possible for a substantially vertical take-off. For cruising flight all the nozzles are rotated to point rearwards for forward propulsion. During the landing approach all the nozzles may be turned downwards to obtain increased lift. Subsequently the pipe bend nozzles may be rotated to point both downwards and forwards for braking thrust to shorten the landing run. Alternatively the nozzles may be pointed as far downwards as possible to permit a substantially vertical landing approach. Whenever extra thrust is required, both combustors 16 may be operated simultaneously to burn fuel in the compressed air supplied to them so as to deliver combustion gas to the nozzles 15.

It will be seen that the two units, considered as a pair, feed eight nozzles symmetrically disposed about them including a nozzle 15 and a nozzle 23 on one side of the pair, and a nozzle 15 and a nozzle 23 on the other side of the pair, and that the nozzles 15 and 23 on each side are supplied with gas under pressure one nozzle being supplied from one unit and the other being supplied from the other unit. Thus, in operation, in the event of failure of either engine of the pair, a nozzle on the side of the failed engine remote from the still operative engine still remains operative to produce a propulsive thrust.

Should the engine of the port unit 14 fail, for example, the supply of compressed air to the nozzle 15 of the starboard wing 12 will fail but the supply of compressed air from the starboard engine to the port nozzle 15 will continue. Since the port nozzle 15 is located well outboard at the wing tip, the thrust from the only active nozzle on the port wing is better able to counter the turning moment about the centre of gravity of the aircraft due to the combined thrust from the jets of the three pipe bend nozzles of the starboard engine which are all located well inboard. In addition the balancing thrust from the port nozzle 15 may be considerably increased by operation of the port combustor 16 thus producing a jet of combustion gas from the port nozzle 15. In these ways the invention may be employed to reduce considerably any asymmetric thrust resulting from failure of one of the engines.

FIGURE 5 shows a valve system interposed between the inclined pipes 21 and the cross-over ducting 17, 18. These pipes communicate with a pressure-equalising chamber 39 the inlets thereto being controlled by vanes 40, 41 which are pivotally mounted about their centres and are adapted to be opened by the respective air flows passing into the chamber 39. Two outlet pipes 43, 44 lead the air from the chamber 39 to the inboard ends of the ducting 17, 18 and the flow therethrough is controlled by valves **45*a*, 45*b* mounted on pistons 46*a*, 46*b*. The latter operate in a cylinder 47 and are urged outwards in opposite directions by a coiled spring 48. Bleed pipes 49, 50 convey air tapped from the compressor systems of the units 14 to the ends of the cylinder 47 so that in normal operation the pressure of the tapped air acts on the pistons 46*a*, 46*b* to urge them inwards towards each other, compressing the spring 48, and withdrawing the valves 45*a*, 45*b* from the outlet pipes 43, 44**.

If the port engine fails, the pressure in the bleed pipe 49 falls and the spring 48 will cause the valve **45*a* to move across the outlet pipe 44 and cut off the supply of compressed air to the starboard nozzle 15. In addition the cessation of flow in the port inlet pipe 21 permits the air pressure in chamber 39 to pivot the vanes 40 to their closed position and prevent air escaping into the port inlet pipe 21 from the chamber 39. Conversely if the starboard engine fails the vanes 41 will close the starboard inlet pipe 21 and the valve 45*b* will be moved across the outlet pipe 43 by its spring-urged piston in order to cut off the supply of compressed air to the port nozzle 15**.

The advantage of this valve system is that under normal operating conditions it ensures equal air pressures in ducts 17, 18 and therefore equal thrusts from the wing tip nozzles.

We claim:

1. An aircraft with a propulsion system comprising port and starboard gas turbine jet propulsion engines which include propulsion nozzles arranged to be supplied with air from the compressor systems of the engines and propulsion nozzles arranged to be supplied with exhaust gas from the turbine systems of the engines, additional propulsion nozzles located outboard of the engines and their aforesaid propulsion nozzles, ducting for conveying air compressed by a port engine to one of the additional propulsion nozzles which is located outboard of a starboard engine, ducting for conveying air compressed by a starboard engine to one of the additional propulsion nozzles which is located outboard of a port engine, said propulsion nozzles and additional propulsion nozzles being adjustable and located to vary their direction of discharge between a rearward direction and a downward direction in which their resultant upthrust passes substantially through the centre of gravity of the aircraft to provide vertical or short take-off and landing capability, and means for interrupting the supply of compressed air to a starboard additional propulsion nozzle should a port engine fail and for interrupting the supply of compressed air to a port additional propulsion nozzle should a starboard engine fail.

2. An aircraft as claimed in claim 1, comprising means for varying the direction of discharge from the additional propulsion nozzles between a rearward direction and a downward direction.

3. An aircraft as claimed in claim 1 wherein the additional nozzles are disposed in the proximity of the wing tips.

4. An aircraft as claim in claim 1, wherein combustors are provided for heating the compressed air supply to the additional nozzles.

5. An aircraft as claimed in claim 4, wherein the combustors are disposed in the ducting just upstream of the additional propulsion nozzles.

6. An aircraft as claimed in claim 1, wherein the ducting comprises individual supply ducts which lead one to each of the additional nozzles from the engines and which communicate between the engine and the additional nozzle with a common supply chamber, pressurised air being supplied to the chamber from the compressor systems of a port engine and a starboard engine, and wherein first valve means is disposed in each of said ducts upstream of the common chamber and second valve means is disposed in each of said ducts downstream of the common chamber, the first and second valve means being actuatable in the event of failure of one of said engines, the first valve means to cut off communication between the common chamber and the engine which has failed and the second valve means to cut off the supply of air from the chamber to the additional nozzle remote from the engine which has failed.

7. An aircraft as claimed in claim 6, comprising means responsive to operating pressures within the engine, which pressure responsive means is connected to the first and second valve means and adapted to actuate closure of the valve means associated with any engine if that engine fails.

8. An aircraft with a propulsion system comprising port and starboard gas turbine jet propulsion engines which include compressor system, turbine systems driving the compressor systems, propulsion nozzles arranged to be supplied with air from the compressor systems of the engines and propulsion nozzles arranged to be supplied with exhaust gas from the turbine systems of the engines, the nozzles being adjustable to vary their direction of discharge between a rearward direction and a downward direction, two jet pipe members mounted one on the port wing-tip and the other on the starboard wing-tip each of which jet pipe members extends substantially parallel to the fore-and-aft axis of the aircraft and terminates at its rearward end in an additional propulsion nozzle, ducting for conveying air compressed in a port engine to the jet pipe member on the starboard wing-tip and ducting for conveying air compressed in a starboard engine to the jet pipe member on the port wing-tip.

9. An aircraft having port and starboard wings, an engine on the port wing and an engine on the starboard wing, each of which engines is a gas-turbine jet-propulsion engine having a compressor system, a turbine system driving the compressor system, a nozzle connected to be supplied with compressed air from the compressor system, and at least one nozzle connected to be supplied with exhaust gas from the turbine system, which nozzles are adjustable to vary their direction of discharge between a rearward direction and a downward direction, two additional nozzles mounted one on the starboard wing-tip and the other on the port wing-tip and adapted to produce thrusts concentrated at the respective wing tips, which additional nozzles are adjustable to vary their direction of discharge between a rearward direction and a downward direction, the engine nozzles and the additional nozzles being located so that when they are directed downwardly their resultant thrust passes substantially through the centre of gravity of the aircraft, ducting for conveying air compressed in the port engine to the additional nozzle at the starboard wing-tip, and ducting for conveying air compressed in the starboard engine to the additional nozzle at the port wing-tip.

10. An aircraft having a propulsion system comprising two gas turbine jet propulsion units each of which includes turbine means and compressor means driven by the turbine means, two rotatable propulsion nozzles offset to one side of the two units, first ducting connecting one of said nozzles with the compressor means of one of the units whereby compressed air is always supplied to that nozzle whenever said one unit is operating, second ducting connecting the other nozzle with the turbine means of the other unit whereby turbine exhaust gas is always supplied to that other nozzle whenever the other unit is operating, two rotatable further propulsion nozzles offset to the other side of the two units, third ducting connecting one of the further nozzles with the compressor means of said other unit whereby compressed air is always supplied to that further nozzle whenever said other unit is operating, and fourth ducting connecting the other of the further nozzles with the turbine means of the said one unit whereby turbine exhaust gas is always supplied to the other of the further nozzles whenever said one unit is operating, said nozzles and said further nozzles being rotatable to vary their direction of discharge between rearward and downward directions and all said ducting defining wholly separate flow paths for their respective flows of air or gas.

11. An aircraft as claimed in claim 10, wherein means is provided, upstream of the outlets of those of the nozzles to which compressed air is supplied, for burning fuel in the air supplied to those nozzles.

12. An aircraft as claimed in claim 10, wherein each unit has at least one nozzle which is adjustable to obtain braking thrust on the aircraft.

13. An aircraft according to claim 10, wherein the nozzles are so arranged that if one of the units fails the line of action of the resultant thrust from the pair of units is not thereby displaced.

References Cited by the Examiner

UNITED STATES PATENTS

| | | | |
|---|---|---|---|
| 2,848,181 | 8/58 | Landers | 244—58 |
| 2,912,189 | 11/59 | Pouit | 244—15 |
| 2,954,944 | 10/60 | Huet | 244—12 |

FOREIGN PATENTS 226,135 12/59 Australia.

FERGUS S. MIDDLETON, *Primary Examiner.*

RALPH D. BLAKESLEE, MILTON BUCHLER, *Examiners.*